April 8, 1941.                    C. O. CRESSY                    2,237,928
                            REMOTE INDICATING SYSTEM
                              Filed April 15, 1939
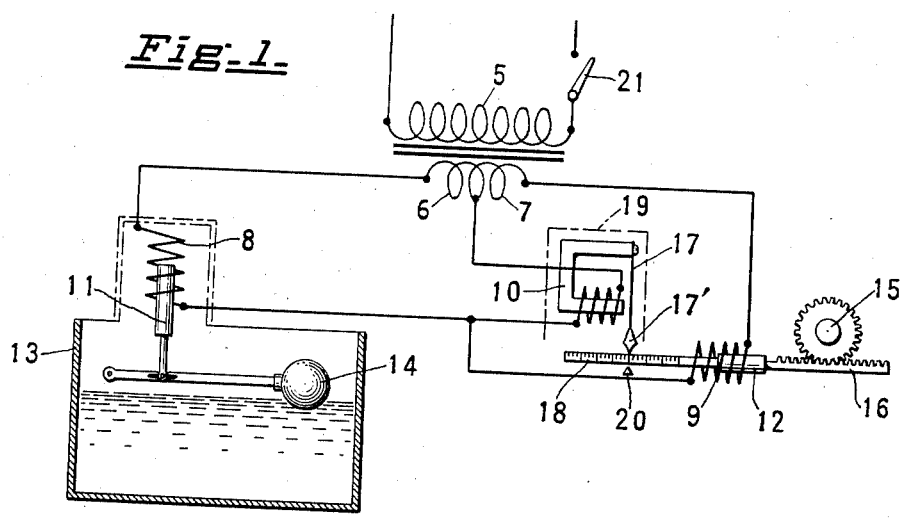
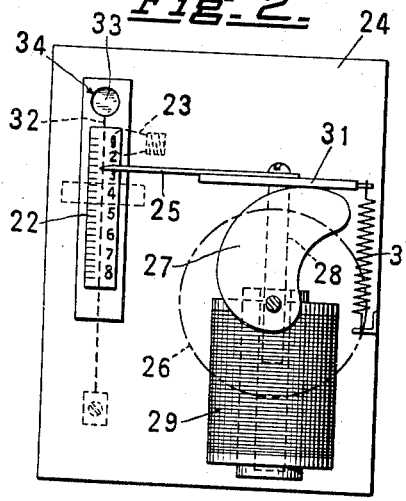 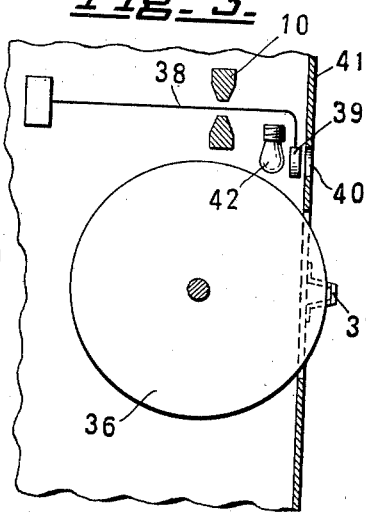 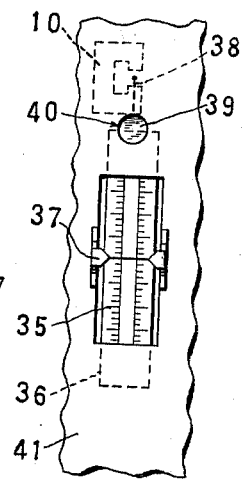
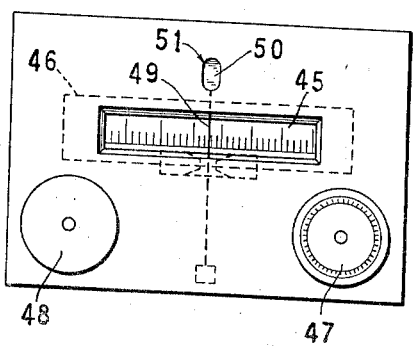 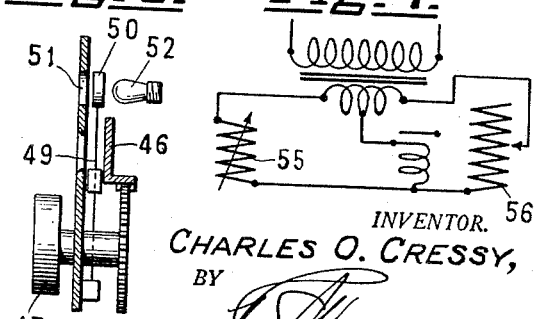
INVENTOR.
CHARLES O. CRESSY,
BY
ATTORNEY.

Patented Apr. 8, 1941

2,237,928

UNITED STATES PATENT OFFICE 2,237,928

REMOTE INDICATING SYSTEM

Charles O. Cressy, East Providence, R. I.

Application April 15, 1939, Serial No. 268,063

6 Claims. (Cl. 177—351)

The object of this invention is to provide simple, inexpensive and reliable means for determining or indicating at a selected point what movement or measurable change of condition has taken place at a distant point. Another object is to provide a device which can be readily installed and actuated by ordinary so-called household current. A special object is to provide an electrical indicating system which is not affected by fluctuations in line voltage. It is especially desired to check or measure the level of liquid at a distant point. Such a device however can be readily designed as hereinafter set forth to indicate and measure various other types of changes of movement or condition such as changes of temperature which take place at remote points.

I employ what may be termed a modified form of alternating current bridge circuit with an electro-magnetically vibrated tuned reed connected across the center. Each branch has an impedance, one of which is varied automatically according to the change which takes place. The impedance in the other branch is then adjusted until the reed ceases to vibrate which occurs when the bridge circuit is balanced. By properly calibrating the adjusting means it is possible to indicate what change has taken place at a distance.

The reed is arranged adjacent the scale of the adjusting means so as to constitute a part of the indicating or measuring device. The indicating device may be constructed in several different ways.

One form of the invention herein shown is claimed in my application, Serial Number 186,323, filed January 22, 1938, now Patent No. 2,178,563.

Fig. 1 is a diagrammatic illustration of one form of device and circuit involving my invention as applied to the problem of indicating and measuring the changes in level of a liquid and utilizing inductive reactances and a movable scale adjacent the vibrator.

Fig. 2 is a front elevation showing a form of indicator employing a stationary scale and a movable pointer or index and adjacent vibrator.

Fig. 3 is a side view of another modification showing a movable adjusting drum with a stationary index and adjacent vibrator.

Fig. 4 is a front view of the form shown in Fig. 3.

Fig. 5 is a front view of another modification with a vibrator acting as an index in front of a travelling or movable scale.

Fig. 6 is a vertical sectional view of the form of Fig. 5.

Fig. 7 is a diagrammatic view showing a resistor or inductive resistance for measuring temperatures from a remote point.

Alternating current is supplied from a transformer 5 which may be of the bell ringing type and located preferably at the station of the indicating instrument. The two halves 6 and 7 of the secondary are connected in the opposing branches of the circuit with the coils 8 and 9, respectively.

In the bridging circuit, connected across between the two branches is the magnet coil 10. The coils 8 and 9 have suitable cores 11 and 12 and the coils and cores are so constructed as to permit relative movement. The tank 13 contains the liquid whose level is to be determined from a remote point. A float 14 is suitably connected to move the core 11 so that the reactance of the left hand branch of the circuit varies with the rise and fall of the liquid. The core 12 is arranged to be adjusted at will with respect to the coil 9 by a suitable hand operated device such as a knob 15 geared to the shaft 16 which is connected to the core 12. Unless the reactance in the indicating branch is equal to that in the other branch, current will flow through the bridge circuit coil 10 and the spring reed 17 which constitutes the armature of the electromagnet will vibrate in accordance with the frequency of the current supplied. This vibration is so rapid that the reed is scarcely visible. When the core 12 is adjusted so as to balance the reactance of the two coils, the reed will stop vibrating and can be readily seen. I therefore provide a scale 18 which is connected or geared in suitable manner to move with the core 12. This scale is calibrated to read in suitable units of depth or volume of liquid in the tank.

The reed 17 and its actuating coil 10 may be protected against disturbing fields by a shield 19.

It is understood of course that the reed is tuned to the frequency of the power circuit and that each leg or arm of the secondary has the same ohmic resistance and delivers the same voltage.

It has been found desirable to provide a small enlargement 17' on or adjacent the tip of the reed. This greatly facilitates the operation of adjustment of the reactance of coil 9 since it provides an expanse of observable surface much greater than the fine wire which is frequently used as the reed.

A stationary index mark or pointer 20 may be used adjacent the scale in some cases either with a pointer 17' as shown in Fig. 1 or separately.

A switch 21 may be provided in the supply circuit which may remain open except when a reading is to be taken.

In the form shown in Fig. 2, the scale 22 is stationary and may be translucent and illuminated by lamp 23 behind the face plate 24. The index pointer 25 is moved up and down by the drum or wheel 26 and cam 27 which are geared in any suitable way to move with the core 28 of the solenoid 29. The spring 30 holds the plate 31, carried by the solenoid and connected to the pointer, against the cam. The tuned reed 32 is mounted behind the face plate and has a disc 33 which is visible when stationary through the window 34 in the face plate. When current is turned on, unless the instrument happens to be adjusted to indicate the remote condition of level, pressure, movement, temperature, etc., the reed will immediately vibrate and disappear allowing a light to shine through the window. The instrument is then adjusted until the reed comes to rest and the light is dimmed or extinguished depending upon the relative sizes of the disc 33 and the window 34.

In the form shown in Figs. 3 and 4, the scale 35 is mounted on a drum 36 to rotate behind an index mark or pointer 37. This drum is geared in any suitable manner to an adjustable reactance (such as 9 in Fig. 1). The tuned reed 38 has a disc 39 mounted behind a window 40 in the face plate 41 close to the scale and a lamp 42 is preferably mounted in rear of the disc. This light will appear dim or "out" when the circuit switch is closed and the instrument properly adjusted to indicate or measure the condition existing at the remote station of the system. Such a device when properly illuminated from outside may omit the inside lamp 42 and rely upon a change of color behind the window 40.

In the form shown in Figs. 5 and 6, the scale 45 is on a slide or strip 46 adapted to be adjusted with the reactance (such as 9) by the knob 47. This slide however could be moved automatically if desired. Current may be turned on or off by the switch knob or lever 48. The tuned reed 49 vibrates in front of the scale and serves as an index or pointer when stationary. This reed also may have a disc 50 mounted behind a slot or window 51. A lamp 52 connected in the circuit with the indicator may be employed to shine through the window while the circuit is unbalanced.

In the form shown in Fig. 7 the resistance 55 is varied automatically by temperature or other changes at the remote station and a corresponding resistance 56 is employed at the indicating station. Suitable adjustments and indications of a tuned reed will be arranged in one of the methods above described.

It will be understood that the scales or dials may be calibrated in any desired units of measurement. The same instrument may be used for different measurements by simply providing a suitable scale or dial graduated in the units desired. It should also be understood that the optical system illustrated may be varied within the scope of my invention.

This system is very simple and reliable and is quite insensitive to external influences. It will be understood that its use is not limited to the indication or measurement of liquid levels although that is an important and valuable one but the invention is only limited by the scope of the appended claims.

In all forms of my invention, the impedance of the two branches should be designed and adjusted proportionally in order to indicate the movement which has taken place.

In view of the fact that the reading is taken only when the two branches of the bridge circuit are balanced it will be seen that fluctuations in the alternating current line voltage applied to the transformer will have no disturbing effect. In this respect the system is greatly superior to those employing ordinary rheostats and meters since any fluctuations in voltage in such systems render the meter readings inaccurate.

In case the impedance of one element is greater than that of the other, the remaining elements must be proportioned accordingly. For instance, if the reactance of the tank coil is twice that of the indicating coil, the secondary tap in Fig. 1 should be placed so that the two sections have a reactance ratio of two to one.

In case reactors are used for the variable elements, the reactive component of the impedance of each branch predominates. But if resistors are used for the variable elements of each branch, the reactive and resistive components may be comparable in magnitude. In either case, i. e. whether solenoids or rheostats are used for the variable arms, the resistance of the connecting wires may be of importance in some installations and should be provided for in calculations of such systems.

Likewise it will be understood that equalization of corresponding parts in each branch of the bridge circuit while desirable is not always necessary as long as the ratios of the bridge elements are so chosen that a balance may be obtained. Thus, if the tapped transformer is not tapped exactly in the center, the remaining elements must be so proportioned that a balance may be obtained.

Although the idea of tuned reeds for indicating the flow or direction of electric currents is quite old, I do not think it has heretofore been recognized or known that a bridge circuit with a tuned reed could be used in connection with a scale to serve as an indicator or measuring device as herein set forth. Such an indicator is extremely simple and inexpensive and constitutes an instrument of unchanging responsiveness and great sensitiveness and accuracy.

As the reed is fixed at one end and is free to move throughout the rest of its length there is no friction such as in the bearing of an ordinary galvanometer. There is therefore no question of pivot friction or lubrication. So far as is known the characteristics of the reed are permanent and invariable. Only minute current is required to operate the device and of course there are no sparking contacts. There is practically no problem of maintenance in such a system.

For convenience in reference we may term the mechanism located at the point where changes take place as the transmitter and the mechanism at the remote point where the reading is to be taken as the receiver. Ordinarily the action at the transmitter will be automatic and the action at the receiver will be controlled manually.

I claim:

1. A remote indicating system including two connected branch circuits, each including a source of alternating current and a variable impedance, an electromagnetic device having a coil connected in both branch circuits and a tuned reed with an enlarged tip vibrated by the magnetic field effect, adjusting means for balancing the impedances, a stationary scale and an adjustable index for indicating the amount of movement of said adjusting means, said enlarged tip being stationary and visible clearly only when the impedances are balanced.

2. A remote indicating system comprising two branch connected circuits, each including a source of alternating current and an impedance, an electromagnetic device having a coil connected in both branch circuits and a reed coacting therewith and tuned to the frequency of the alternating current, means for varying the impedance in one branch circuit, means for adjusting the impedance in the other branch circuit and thereby bringing the reed to rest so that it may be seen when current ceases to flow in the coil of the electromagnetic device and means including a scale and the reed for indicating the condition which varies the impedance in the one branch circuit.

3. A remote indicating system comprising a step-down transformer having its secondary in two parts, a bridge circuit having two branches, an impedance and a part of the secondary of the transformer in each branch, an electromagnetic device having a coil connected in both branches, means for varying each impedance, a tuned vibrating reed coacting with the field of the coil and means including a scale and the reed for indicating the variation of the impedances.

4. A remote indicator including an electromagnetic device having a coil and a tuned reed, a bridge circuit including said coil and an impedance, a scale behind said reed and means for simultaneously varying said impedance and moving said scale behind said reed.

5. A remote measuring system comprising two branch connected circuits, each including an impedance, one impedance being located at a point where the change to be measured takes place and the other impedance being at a remote point where the measurement is to be indicated, a source of alternating current for said circuits, an electromagnetic device having means connected in said circuits for creating an electromagnetic field, a reed influenced by said field and turned to the frequency of the alternating current, means for varying the first mentioned impedance according to the change to be measured, means for adjusting the second mentioned impedance and causing the reed to cease vibrating so that it can be observed when the impedances in the two branches are equalized and means including a scale and the reed for indicating the condition to be measured at the remote point.

6. An indicating system comprising a transmitter and a receiver with electrical connections and an alternating current power source, the connections including two branch circuits, the branch circuit at the transmitter including an impedance automatically varied with the condition to be indicated at the receiver, the branch circuit at the receiver including an impedance with means for manually adjusting it, an electromagnetic device having means connected to the branch circuits for creating an electromagnetic field, a vibrating reed under the influence of said field and tuned to the frequency of the alternating source, and indicating means at the receiver including a scale and an index member, means for moving one of the members of the indicating means coincident with the manual adjustment of the impedance at the receiver for indicating the condition to be measured at the receiver when the reed ceases to vibrate.

CHARLES O. CRESSY.